April 29, 1924.

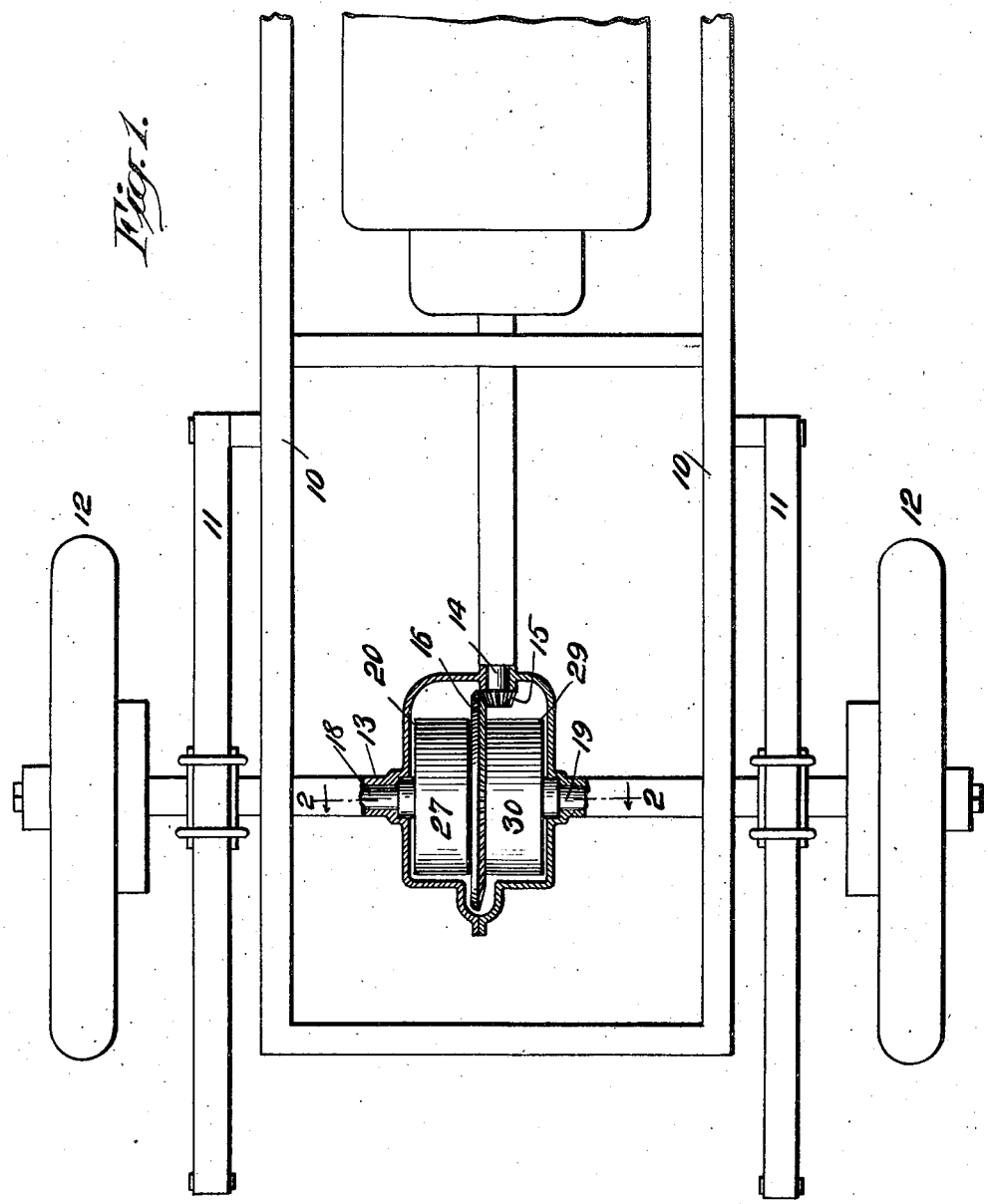

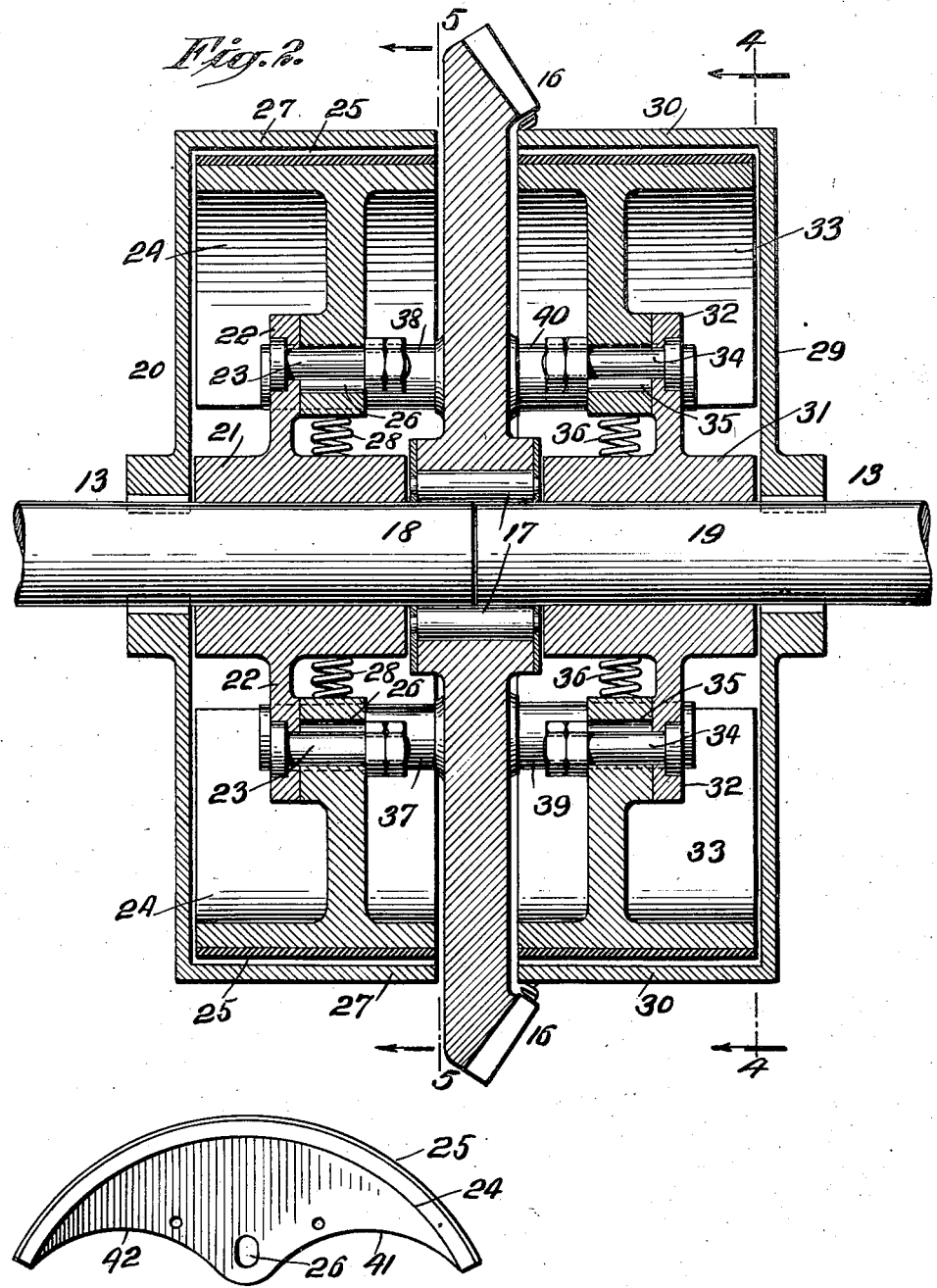

A. E. WILLIAMSON ET AL

MOTOR VEHICLE

Filed Jan. 26, 1921

Inventors
ARTHUR E. WILLIAMSON
JOHN R. CAVE
By their Attorney

Patented Apr. 29, 1924.

1,491,837

UNITED STATES PATENT OFFICE.

ARTHUR E. WILLIAMSON, OF JERSEY CITY, NEW JERSEY, AND JOHN R. CAVE, OF BAYSIDE, NEW YORK.

MOTOR VEHICLE.

Application filed January 26, 1921. Serial No. 440,056.

*To all whom it may concern:*

Be it known that we, ARTHUR E. WILLIAMSON, a citizen of the United States, and a resident of Jersey City, in the county of Hudson and State of New Jersey, and JOHN R. CAVE, a citizen of the United States, and a resident of Bayside, in the county of Queens and State of New York, have jointly invented certain new and useful Improvements in Motor Vehicles, of which the following is a specification.

The invention relates particularly to means for imparting motion to the rear driving axle and main driving wheels of automobiles and motor vehicles generally.

One purpose of the invention is to displace the differential gear or other type of balance gear at present employed in connection with the rear axles of automobiles and avoid well-known objections incident to the use thereof, one of which objections is that with the conventional type of differential gear maximum rotational tendency is given to the wheel which shows the least tractive effort or to that wheel which offers the least resistance, as, for example, the wheel which may be resting on an icy or slippery road surface or the wheel which may momentarily leave the ground when the vehicle is traveling rapidly over a rough road.

In accordance with our invention equal traction is distributed to both driving wheels irrespective of the nature of the road or surface beneath the tires, and hence the invention, as one advantage thereof, makes starting on icy or slippery roads when only one wheel is on resistable ground possible. A further decided advantage of our invention is that it greatly facilitates travel over muddy roads. Equal traction distributed to both the main driving wheels greatly minimizes the tendency of the wheels to skid or resort to side slipping when the vehicle is driven over smooth pavements, which, when the conventional type balance gear is used, would favor greater rotational effort of one wheel over the other. We may mention also that with the use of our invention, when the driving power has been cut off and the vehicle is traveling by its own momentum or going down an incline, the kinetic energy of the vehicle may be utilized to the maximum degree.

In carrying out our invention, in a preferred embodiment thereof, the main driving wheels are secured on the ends of the axle and at about the middle transverse portion of the axle we mount a gear wheel or plate connected up to receive motion from the motor on the vehicle, and upon said axle at each side of said wheel or plate, we secure hollow drums within which are brake-shoes which are initially held free of the co-acting surfaces of the drums by means of springs, and upon the opposite faces of the said gear wheel we provide pins, some of which when the vehicle is to travel forwardly engage said brake-shoes and bind them against the drums and thereby, through the drums and axle, impart equal rotation to the main driving wheels and others of which pins, when the vehicle is to travel backwardly, engage said brake-shoes with said drums and effect the reverse rotation of the axle and driving wheels. When power is cut off from the said gear wheel, the brake-shoes stand free of said drums and the driving wheels are left free to rotate under the kinetic energy of the moving vehicle. The brake-shoes are self-releasing driving elements and when in operation serve to lock the said gear wheel, brake-drums and axle together, both when the vehicle is to travel forwardly and when it is to travel backwardly.

The invention will be fully understood from the detail description hereinafter presented, reference being had to the accompanying drawings, in which:

Fig. 1 is a plan view, partly in horizontal section and partly broken away, of the rear portion of an automobile or motor vehicle constructed in accordance with and embodying our invention;

Fig. 2 is a central section, on a larger scale, with the rear axle partly broken away, of those features of the mechanism more directly embodying our invention;

Fig. 3 is a detached side elevation of one of the brake-shoes constituting one of the operative parts of the mechanism;

Figure 4:
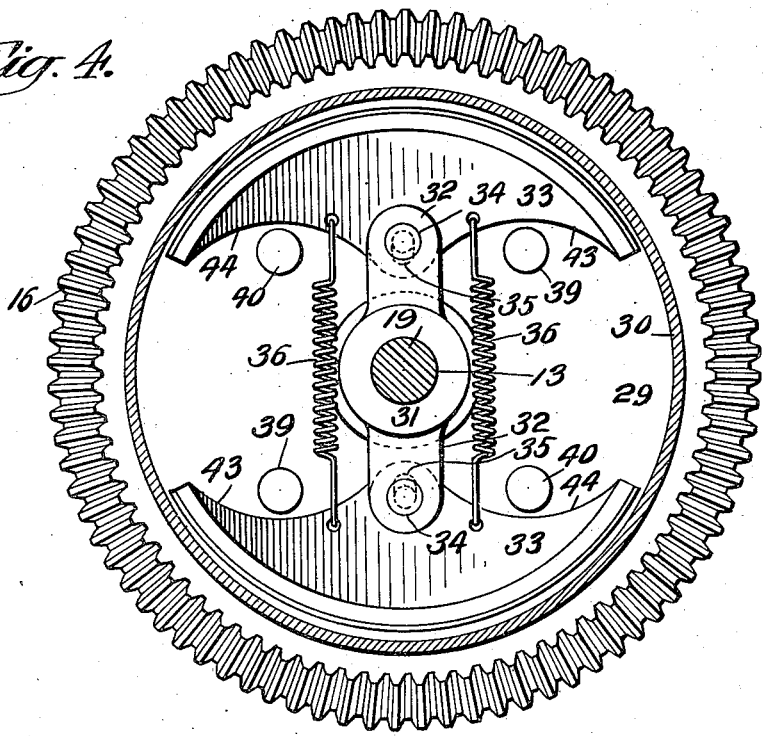
Fig. 4 is a section through the mechanism taken on the dotted line 4—4 of Fig. 2.

In the drawings, 10 designates a conventional form of supporting frame for a motor vehicle, 11 the springs, 12 the rear or main driving wheels, 13 the rear axle upon the ends of which said wheels are rigidly secured, 14 the usual propeller-shaft to which power is imparted from the motor and which, in this instance, is equipped with a beveled pinion-wheel 15, and 16 a beveled gear-wheel in mesh with the pinion 15 and freely mounted on the axle 13, said wheel 16 having roller bearings 17 engaging the axle, as shown in Fig. 2, and said axle 13 being in the present instance and for convenience formed in two sections 18, 19, as more particularly illustrated in Fig. 2. The gear-wheel 16 is applied at the joint between the two sections 18, 19 of the rear axle and overlaps, with the roller bearings 17, the joint between said sections.

Upon the axle section 18 is keyed a drum 20 which is closed at its periphery and outer side and open at its inner side, which is adjacent to one face of the gear-wheel 16. Within the drum 20 we mount on the axle section 18 a sleeve 21 having oppositely projecting arms 22 to which, by means of bolts 23, are pivotally connected segmental brake-shoes 24 (Fig. 5) preferably bearing on their outer edges a suitable lining 25 of asbestos or other convenient material, a number of different kinds of brake lining materials being well known. The web-portions of the shoes 24 are slotted, as at 26 (Fig. 3), where said shoes receive the bolts 23, the slots 26 allowing freedom of motion in the shoes 24 and permitting said shoes to have a pivotal movement to the extent allowed by the rim 27 of the drum 20 and also to have a motion toward and from each other and toward and from the inner walls of the rim 27 of said drum. We connect the shoes 24 at each side of the arms 22 by means of coiled springs 28 whose tension normally acts to draw the shoes 24 inwardly toward each other to the extent permitted by the slots 26, said shoes 24 thus normally being held free of the rim 27 of the drum 20.

Upon the axle section 19 features corresponding with those hereinbefore described with respect to the drum 20 are provided. Upon the axle section 19 is keyed the drum 29 having a peripheral rim or band 30 and being open at its inner side adjacent to the gear-wheel or plate 16. Upon the axle section 19, within the drum 29, is mounted a sleeve 31 having oppositely projecting arms 32 to which brake shoes 33 are connected by bolts 34 which pass through slots 35 in the web portions of the shoes 33, as shown in Fig. 4. The sleeve 31, arms 32, shoes 33 and bolts 34 correspond with the like features hereinbefore described with respect to the drum 20. The shoes 33 are, at opposite sides of the arms 32, connected together by coiled springs 36 whose normal initial action is to hold the shoes 33 free of the rim or band 30 of the drum 29, as shown in Figs. 2 and 4, the outer ends of the slots 35 then being against the bolts 34.

Figure 5:
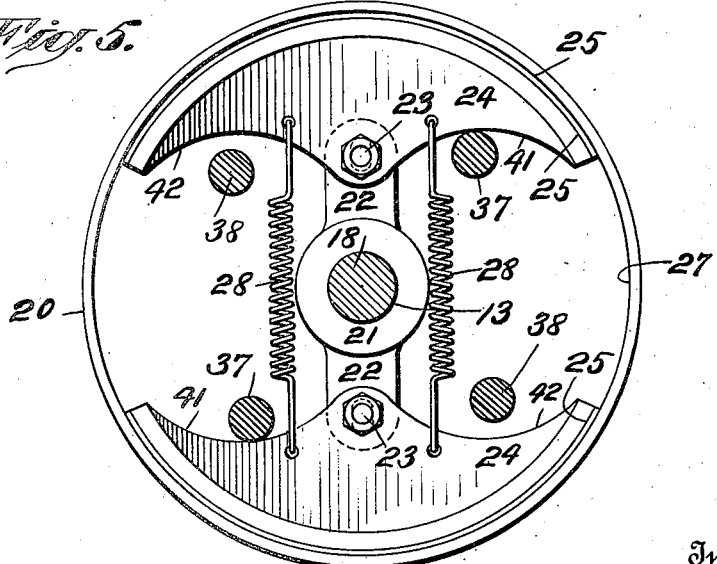
Fig. 5 is a section through the same, taken on the dotted line 5—5 of Fig. 2.

The gear-wheel 16 is disposed between the adjacent open ends of the drums 20, 29, and has on the opposite faces thereof laterally projecting pins which enter said drums and are provided to engage the brake-shoes 24, 33, respectively, one face of said gear-wheel 16 carrying four corresponding pins, two of which are numbered 37 and two 38, and the other face of said gear-wheel 16 likewise carrying four corresponding pins, two of which are numbered 39 and the other two 40. The pins projecting from opposite faces of the gear-wheel 16 are in line with each other, the pins 37 on one face of said wheel being in line with the pins 39 on the opposite face of said wheel, and the pins 38 on one face of said wheel being in line with the pins 40 on the opposite face of said wheel. The pins 37, 38 project outwardly into the drum 20 and in near relation to curved or cam edges 41, 42, respectively, formed on the webs of the shoes 24 and at opposite sides of the bolts 23, as shown in Fig. 5, and the pins 39, 40 at the opposite face of the wheel 16 project outwardly into the drum 29 and in near relation to similar curved or cam edges 43, 44, respectively, formed on the webs of the shoes 33 and at opposite sides of the bolts 34 which connect said shoes with the arms 32, as shown in Fig. 4. The pins 37, 38, 39, 40 are utilized to drive the brake-shoes 24, 33 outwardly against the rims of the drums 20, 29 and through said brake-shoes and drums to impart rotary motion to the rear axle 13, two of said pins on each face of said gear-wheel being in action when the vehicle is to travel forwardly and the other two of said pins on each face of said gear-wheel being in action when the vehicle is to travel in a reverse direction. For illustration, if it be assumed that motion is imparted from the propeller shaft 14 to the gear-wheel or plate 16 for effecting the forward travel of the vehicle, said gear-wheel 16, looking at the toothed face thereof, will rotate clockwise, and under these circumstances the pins 38 on one face thereof and the corresponding pins 40 on the opposite face thereof will be carried against the curved surfaces 42, 44, respectively, of the shoes 24, 33, respectively, and drive said shoes outwardly into binding engagement with the rims of the drums 20, 29, with the result that during the rotation of the gear-wheel 16, said drums 20, 29 will receive rotary motion and impart the same to the rear axle 13 and through said axle to the driving wheels 12, equal traction or rotational effort being imparted to both wheels 12. When the propeller shaft 14 rotates the gear-wheel 16 in a reverse direction so as to effect a reverse direction of travel in the vehicle, or cause said vehicle to move backwardly, the gear-wheel 16, looking at the toothed face thereof, will rotate counter clockwise, and in doing so carry the pins 38, 40, respectively, from engagement with the brake-shoes 24, 33 and move the pins 37, 39, against said brake-shoes 24, 33 and cause said shoes to bind against the rims of the brake-drums 20, 29 and therethrough effect the reverse rotation of the axle 13 and driving wheels 12. The pins 37 are at diagonally opposite points, one located to engage one end portion of one shoe 24 and the other to engage at the same time the diagonally opposite end portion of the other shoe 24, and this same diagonal arrangement of the pins in pairs is carried out with respect to the pins 38, 39, 40. When the gear-wheel 16 is set in motion to cause the vehicle to travel forwardly, two of the diagonally disposed pins (38, 40) at opposite faces thereof are brought into action in connection with the brake-shoes 24, 33 to rotate the drums 20, 29, axle 13 and wheels 12 clockwise, and when the motion of the gear-wheel 16 is reversed to cause the vehicle to travel backwardly, the other two diagonally disposed pins (37, 39) on opposite faces of said gear-wheel act against the shoes 24, 33 to rotate the drums 20, 29 reversely or counter clockwise and thereby effect the reverse rotation of the axle 13 and wheels 12. When no power is applied to the wheel 16 or when the vehicle is at rest, the springs 28, 36 hold both sets of shoes 24, 33 free of the drums 20, 29. The brake-shoes 24, 33 are driving elements which are automatically releasable from the drums 20, 29, and this is important in that it renders the mechanism sensitive to changes in direction of motion of the shaft 14 and also in that when power has been cut off from the propeller shaft 14 with the vehicle in motion the vehicle may coast or move down an incline without retardation from the brake-shoes and with the utilization of the kinetic energy of the vehicle to the maximum degree.

Our invention is of material importance in that it displaces entirely the conventional differential gear and secures an equal distribution of the tractive or rotational effort to both wheels, whereby starting on icy or slippery roads when only one wheel is on resistible ground, is rendered possible, and the invention is also important in that skidding and like action is thereby reduced to a minimum; the invention is also of advantage in other respects which do not require specific mention.

We illustrate our invention as making use of two shoes 24 and two shoes 33, but it is to be understood that we do not limit ourselves to the specific form or number of the said shoes 24, 33 shown, since we contemplate the use of any number of said shoes in each drum as occasion may require. It will be found to be entirely convenient to locate, for example, four shoes in each drum and connect them to arms on the sleeves 21, 31 in the same manner that the shoes shown are connected to the arms of said sleeves, and when four shoes are made use of each sleeve 21, 31 will have four arms instead of two and each face of the wheel 16 will be provided with eight pins instead of four, the additional shoes, arms and pins being a mere duplication of those illustrated.

What we claim as our invention and desire to secure by Letters Patent, is:

1. In a motor vehicle and in combination therewith, a main driving axle, driving wheels on the ends thereof, a rotary member free on said axle connected to receive motion from the vehicle motor, drums rigid on said axle at opposite sides of said rotary member, movable automatically releasable driving elements freely supported from said axle within said drums and normally free thereof and adapted to be engaged therewith for driving said drums, axle and driving wheels in either direction, and means on the opposite faces of said rotary member for alternately engaging diametrically opposite portions of said driving elements, according to the direction of motion desired, for binding said elements against said drums.

2. In a motor vehicle and in combination therewith, a main driving axle, driving wheels on the ends thereof, a rotary member free on said axle connected to receive motion from the vehicle motor, drums rigid on said axle at opposite sides of said rotary member, sleeves on the axle within the drums having outwardly projecting arms, shoes connected with said arms and movable to a limited extent thereon toward and from the bands of the drums and said shoes having outer segmental surfaces to engage said bands and inner edges extending at opposite sides of said arms, springs connected with said shoes to render the shoes automatically releasable from said bands, and pins on the opposite faces of said rotary member to engage inner diametrically opposite edges of said shoes when the vehicle is to be propelled in one direction and pins to engage the other diametrically opposite edges of said shoes when the vehicle is to travel in the opposite direction, the engagement of the pins with said shoes serving to move the shoes against and bind them to said drums for driving said drums, axle and wheels.

3. In a motor vehicle and in combination therewith, a rear axle, driving wheels on the ends thereof, drums having a rigid relation to said wheels and being concentric therewith, radially movable driving shoes within said drums and normally not operatively connected therewith and automatically releasable therefrom, and a rotatable driving member normally free on said axle and connected to receive motion from the vehicle motor and having on its opposite faces means to engage inner diametrically opposite ends of said shoes when the vehicle is to be propelled in one direction and the other diametrically opposite ends of said shoes when the vehicle is to travel in the opposite direction, the engagement of said driving member with said shoes serving to move said shoes against and bind them to said drums for rotating the same and therewith said wheels.

In witness whereof we have hereunto signed our names.

ARTHUR E. WILLIAMSON.
JOHN R. CAVE.